United States Patent [19]

Ty et al.

[11] 3,962,664
[45] June 8, 1976

[54] CURRENT PROTECTOR

[75] Inventors: Henry Ty, Attleboro, Mass.; Alfred J. White, North Providence, R.I.; Roger L. Boisvert, Blackstone; Raymond M. Sears, Attleboro, both of Mass.

[73] Assignee: Texas Instruments Incorporated, Dallas, Tex.

[22] Filed: Aug. 25, 1975

[21] Appl. No.: 607,161

[52] U.S. Cl. .............................. 337/86; 317/13 C; 317/40 R; 337/88; 337/135
[51] Int. Cl.² ...................................... H01H 61/00
[58] Field of Search .......... 337/135, 136, 124, 125, 337/88, 86; 317/40 R, 16, 13 C

[56] References Cited
UNITED STATES PATENTS

| | | | |
|---|---|---|---|
| 2,446,474 | 8/1948 | Harrold | 317/13 C |
| 2,574,869 | 11/1951 | Green | 337/88 |

*Primary Examiner*—Harold Broome
*Attorney, Agent, or Firm*—John A. Haug; James P. McAndrews; Russell E. Baumann

[57] ABSTRACT

A current sensing, self-heating device for protecting equipment against abnormal current levels which is automatically resettable under mild overcurrent conditions and nonresettable under severe overcurrent conditions. The device comprises a thermostat metal assembly with a temperature compensating portion and an actuating portion which is placed adjacent a nonresettable two-position snap-acting blade electrically connected to ground. During normal operation current flows from the line source through the actuating portion of the thermostat metal assembly to the equipment. However, if an overcurrent condition occurs the heat generated in the actuating portion of the assembly will bend the assembly and cause it to make contact with the blade shorting the current from the line source to ground. As long as the overcurrent is not above a prescribed level, the assembly will bend back out of contact with the electrically grounded blade and again provide current to the equipment upon resumption of normal current levels. But if the overcurrent is above a preselected level, thermostat assembly will cause the nonresettable blade to snap to permanently electrically ground the device.

8 Claims, 4 Drawing Figures

CURRENT PROTECTOR

BACKGROUND AND SUMMARY OF INVENTION

The present invention relates generally to overcurrent protection devices and more particularly to a sneak current device for the protection of telecommunication equipment against abnormal current levels.

Equipment protection devices which guard against abnormal current levels are well known in the art. A typical example is a one shot device employing a low melting point material which will melt upon the occurrence of an over-current condition and ground the device. These devices do provide protection but do not provide a short enough response time and are not resettable for small current overloads. The time delay in heating up the melting material is too long for some applications. Also the devices tend to vary one from another because of slight differences in compositions of the melting material which cause for different melting temperatures. In addition if a large variation in ambient temperature range exists in which this device operates, the current level which causes a failure condition can vary appreciably. Other types of devices are resettable for small overcurrent conditions but do not permanently ground the device for large overcurrent conditions.

Accordingly it is an object of the present invention to provide an improved overcurrent protection device.

It is another object of the present invention to provide an overcurrent protection device with improved response time to an overcurrent condition.

It is a further object of the present invention to provide an overcurrent protection device with an ambient temperature compensating feature.

It is still a further object of the present invention to provide an overcurrent protection device which is of simple, inexpensive and rugged construction.

Other objects and features of this invention will be in part apparent and in part pointed out hereinafter.

Briefly, the overcurrent sensing device of this invention comprises a housing member to which a set of line contacts are secured in and in which a nonresettable, two-position snap-acting blade and a thermostat metal assembly in cantilever mounted. The line contacts, snap-acting blade, and thermostat metal assembly are electrically insulated from one another but still are stacked in close proximity to each other. The snap-acting blade is electrically connected to ground while the thermostat metal assembly is connected to the line source for transmitting current to the operating equipment. Upon the occurrence of a mild overcurrent condition, the thermostat metal assembly heats up and bends to come into contact with the snap-acting blade and therefore ground the line current. On reoccurrence of a normal current level, the assembly returns to its initial position to allow current to flow to the equipment. However, if the overcurrent condition is of a large enough magnitude and for a long enough duration, the assembly will exert enough force on the blade to cause it to snap and come into contact with the line contacts and thus permanently grounding the device. Once in this mode, the device is not automatically resettable.

BRIEF DESCRIPTION OF DRAWINGS

Corresponding reference characters indicate corresponding parts throughout the several views of the drawings.

DESCRIPTION OF THE PREFERRED EMBODIMENT

Figure 1:
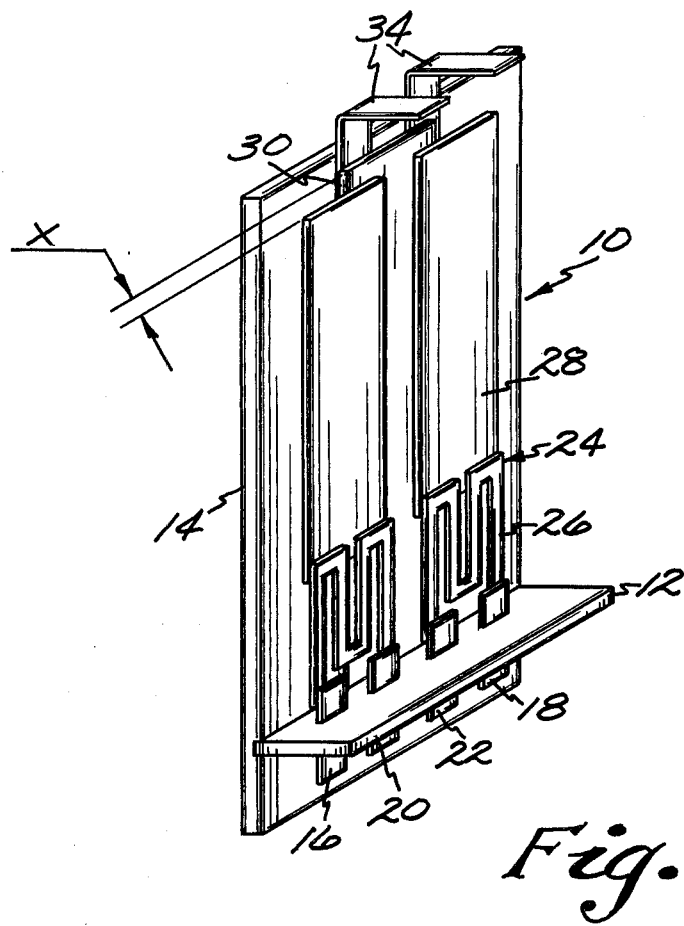
FIG. 1 is a perspective view of the overcurrent protection device of this invention.
Figure 2:
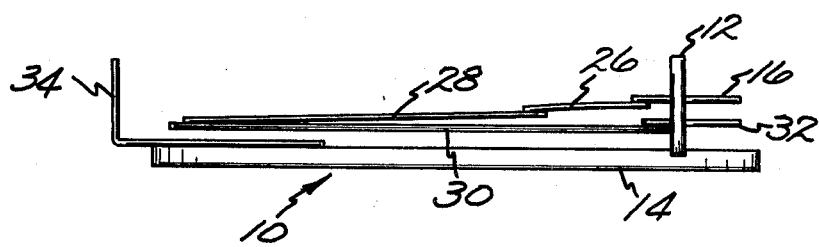
FIG. 2 is a side view of the overcurrent protection device of this invention in the resettable mode with the thermostat metal assemblies grounded against a snap-acting blade.
Figure 3:
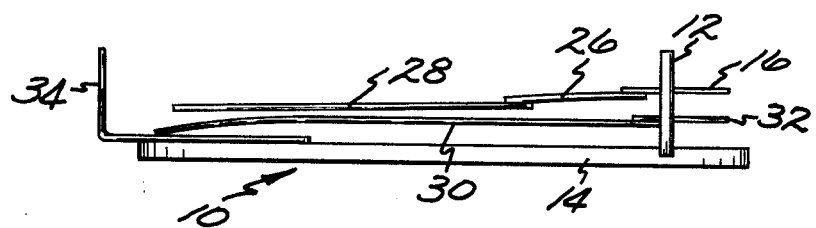
FIG. 3 is a similar view to FIG. 2 in the nonresettable mode with the snap-acting blade in contact with the line contacts.

Referring to the drawings, 10 in FIGS. 1–3 indicates the novel overcurrent protection device as provided by this invention. The device 10 preferably includes a base 12 which extends out perpendicularly from a side wall 14 as best shown in FIG. 1. The base and side wall serve as the support member or housing for the device and are preferably formed of a strong rigid dielectric material such as glass-filled nylon or the like.

Two line terminals 16 and 18 and two load terminals 20 and 22 are secured in base 12 as by mechanical means, epoxy or the like extending out of the base from both the top and the bottom. Line terminals 16 and 18 are to be connected to line sources of power and load terminals 20 and 22 are to be connected to operating equipment. Line terminal 16 and load terminal 20 comprise the first set of terminals and line terminal 18 and load terminal 22 comprise the second. It is to be understood device 10 would function in the same manner if there was only one set of terminals in the device. Terminals 16, 18, 20, and 22 are made from an electrical conductive material such as copper or copper alloys.

Figure 4:
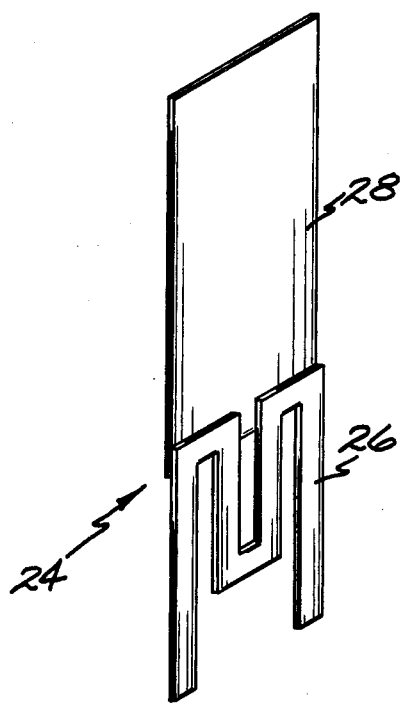
FIG. 4 is an enlarged perspective view of the thermostat metal assembly of this invention.

A thermostat metal assembly 24 as best shown by FIG. 4 is cantilever mounted as by welding to each set of terminals. Assembly 24 has a self-heating actuator portion 26 and a compensating portion 28. Both actuator portion 26 and compensating portion 28 are preferably made of a thermostat metal material having a first outer layer of a first preselected metallic alloy having a relatively high coefficient of thermal expansion and a second outer layer of a second preselected metallic alloy having a relatively lower coefficient of thermal expansion. An example of a preferable material would be a composite with a low coefficient of thermal expansion layer of an alloy of 36 percent by weight nickel and the balance iron and a high coefficient of thermal expansion layer of an alloy of 72 percent by weight manganese, 18 percent by weight copper, and 10 percent by weight nickel.

Actuator portion 26 preferably is of a multi-legged, grid-type design as best shown by FIG. 4 to act as a heating element for the device. Compensating portion 28, on the other hand, is preferably rectangular in shape. Portion 28 extends from portion 26 being joined so as to be electrically and thermally insulated from one another except for a point contact between the two as by a spot weld or a separate wire lead connecting the two to provide an electrical grounding path from actuator portion 26 through compensating portion 28 to be discussed more fully below. Additionally the joining of portion 26 and portion 28 is such that the high expansion side of portion 26 is opposite the high expansion side of portion 28. The reason for this is to provide ambient compensation as will be more fully discussed below.

Positioned preferably directly behind the pair of thermostat metal assemblies 24 as shown in FIGS. 1–3 is a nonresettable, two-position snap-acting blade 30 electrically connected to ground. Snap-acting blade 30 may be cantilever mounted to a terminal 32 connected to ground secured in the base as shown in FIGS. 2 and 3 or may be directly cantilever mounted to the base. The blade is essentially co-extensive in height with assemblies 24 being centered between them providing a gap X as shown in FIG. 1 between the assemblies and the blade. The blade is snap-acting from a first position as shown by FIG. 2 to a second position as shown by FIG. 3 but is not resettable except by manually moving the blade back to the original position. Blade 30 is preferably made from a rigid electrically conductive metallic material such as beryllium copper.

In accordance with this invention a pair of line contacts 34 are positioned preferably behind blade 30 as shown in FIGS. 1–3 to be engageable with the blade when it has snapped to the second position. Line contacts 34 are connected to the line portions of the circuit when device 10 is in use so the engagement of blade 30 and contacts 34 grounds the device.

Accordingly upon the presence of a normal operating current level, for example, 0.25 amperes, current flows into the device from line sources through the two line terminals 16, 18 and actuator portions 26 of thermostat metal assemblies 24 and out load terminals 20, 22 to the equipment. The gap X between the thermostat assemblies 24 and blade member 30 remains essentially constant under these normal operating conditions. However, upon an overcurrent condition arising, the current flowing through thermostat actuator portion 26 causes it to heat up which causes assembly 24 to bend toward blade member 30 closing gap X and coming into contact with the blade as shown by FIG. 2. This contacting between the two members 24, 30 grounds the circuit through terminal 32 and thereby protects the equipment from the overcurent condition.

For small overcurrent conditions, for example under two amperes the bending force of thermostat actuator is not of large enough magnitude to cause blade 30 to snap to its second position and therefore upon return to a normal operating current level the actuator portion will return to its original position leaving the blade still in its first position. This design makes the device automatically resettable for small overcurrent conditions. However, for large overcurrent conditions, for example above 2 amperes, the deflection of actuator 26 will cause the snap-acting blade to snap to its second position as shown by FIG. 3 thereby permanently shorting the device to ground.

As previously mentioned actuator portion 26 and compensating portion 28 of assembly 24 are made of a thermostat metal material and are joined such that the high expansion side of portion 26 is opposite the high expansion side of portion 28. This joining configuration provides for ambient compensation in the device. As the ambient temperature changes actuator portion will bend in one direction while the compensating portion bends in the opposite thus keeping gap X between assembly 24 and blade 30 essentially constant for different ambient temperatures.

Calibration for device 10 is determined by the selection of material for the thermostat metal assembly and the snap-acting blade and in setting the gap X between the assembly and the blade. To ensure consistency from device to device readjusting of gap X can be made after final assembly.

Obviously many modifications and variations in the present invention are possible in light of the above teachings. The description as given is furnished as being exemplary of our invention and is not intended in any way to limit the scope of the appended claims, which are to be construed as broad as the prior art will allow.

We claim:

1. An overcurrent protection device for the protection of electrically operated equipment upon an overcurrent condition comprising mounting means, actuation means mounted in said mounting means, a blade member mounted in said mounting means electrically connected to ground and adapted to be engaged by said actuation means upon the occurrence of an overcurrent condition, said blade being snap-acting having a first overcurrent position from which said device is automatically resettable and a second overcurrent position from which said device is not automatically resettable, and line contact means adapted to be engageable by said blade when in said second overcurrent position for permanently grounding the device.

2. An overcurrent protection device as set forth in claim 1 wherein said actuation means includes an actuating portion and a temperature compensating portion, said actuating and compensating portions being made from thermostat metal material oppositely connected one to another to provide ambient temperature compensation.

3. An overcurrent protection device as set forth in claim 2 wherein said actuating portion is self-heating in response to an overcurrent condition.

4. An overcurrent protection device as set forth in claim 3 wherein said actuating portion and said compensating portion are essentially thermally insulated one from another while being in electrical contact with one another.

5. An overcurrent protection device for the protection of electrically operated equipment comprising a housing with at least one line terminal and one load terminal mounted therein, at least one actuation assembly member responsive to an overcurrent condition mounted to said line terminal and load terminal, a blade member mounted in said housing electrically connected to ground and adapted to be engaged by said assembly member upon an occurrence of an overcurrent condition, said blade being snap-acting having a first overcurrent position from which said device is automatically resettable and a second overcurrent position from which said device is not automatically resettable, and at least one line contact connected to a line power source for the equipment adapted to be engageable by said blade when in said second overcurrent position for permanently grounding the device.

6. An overcurrent protection device as set forth in claim 5 wherein said actuation assembly member includes an actuating portion and a temperature compensating portion, said actuating and compensating portions being made from thermostat metal material oppositely connected one to another to provide ambient temperature compensation.

7. An overcurrent protection device as set forth in claim 6 wherein said actuating portion is self-heating in response to an overcurrent condition.

8. An overcurrent protection device as set forth in claim 7 wherein said actuating portion and said compensating portion are essentially thermally insulated one from another while being in electrical contact with one another.

* * * * *